United States Patent [19]

Jones, Jr. et al.

[11] 4,190,872
[45] Feb. 26, 1980

[54] THIN FILM INDUCTIVE TRANSDUCER

[75] Inventors: Robert E. Jones, Jr.; Walther Nystrom, both of San Jose, Calif.

[73] Assignee: International Business Machines Corporation, Armonk, N.Y.

[21] Appl. No.: 972,104

[22] Filed: Dec. 21, 1978

[51] Int. Cl.² ............................ G11B 5/12; G11B 5/22; G11B 5/20
[52] U.S. Cl. .................................... 360/125; 360/122; 360/123
[58] Field of Search ................ 360/125, 122, 119–120, 360/126–127

[56] References Cited

U.S. PATENT DOCUMENTS

| | | | |
|---|---|---|---|
| 3,271,751 | 9/1966 | Proebster | 360/123 |
| 3,344,237 | 9/1967 | Gregg | 360/123 |
| 3,700,827 | 10/1972 | Nagao | 360/125 |
| 3,781,476 | 12/1973 | Hanazono et al. | 360/125 |
| 3,846,841 | 11/1974 | Lazzari et al. | 360/121 |
| 4,016,601 | 4/1977 | Lazzari | 360/122 |

*Primary Examiner*—Alfred H. Eddleman

*Attorney, Agent, or Firm*—Henry E. Otto, Jr.

[57] ABSTRACT

This thin film inductive transducer comprises a yoke structure consisting of a pole tip region which joins a back region. To maximize resolution during reading of magnetic transitions from a moving magnetic recording medium, the pole tip region is of preselected constant relatively narrow width, and composed of magnetic layers having edges which extend in a direction normal to the medium for a distance D from an air bearing surface ABS to the back region and having a small thickness at least adjacent the ABS. To minimize the effects of spurious signals from adjacent tracks on the medium, distance D is at least 5/d, where d is the recording density on the medium; however, to maximize transducer efficiency, distance D is not increased significantly above 5/d. To oppose saturation of the yoke structure with applied current and enhance the efficiency of the transducer during recording, the cross-sectional area of the yoke structure is increased in the back region by progressively increasing its width rearward of the pole tip region and concurrently increasing the thickness of said magnetic layers at least about 60%.

10 Claims, 3 Drawing Figures

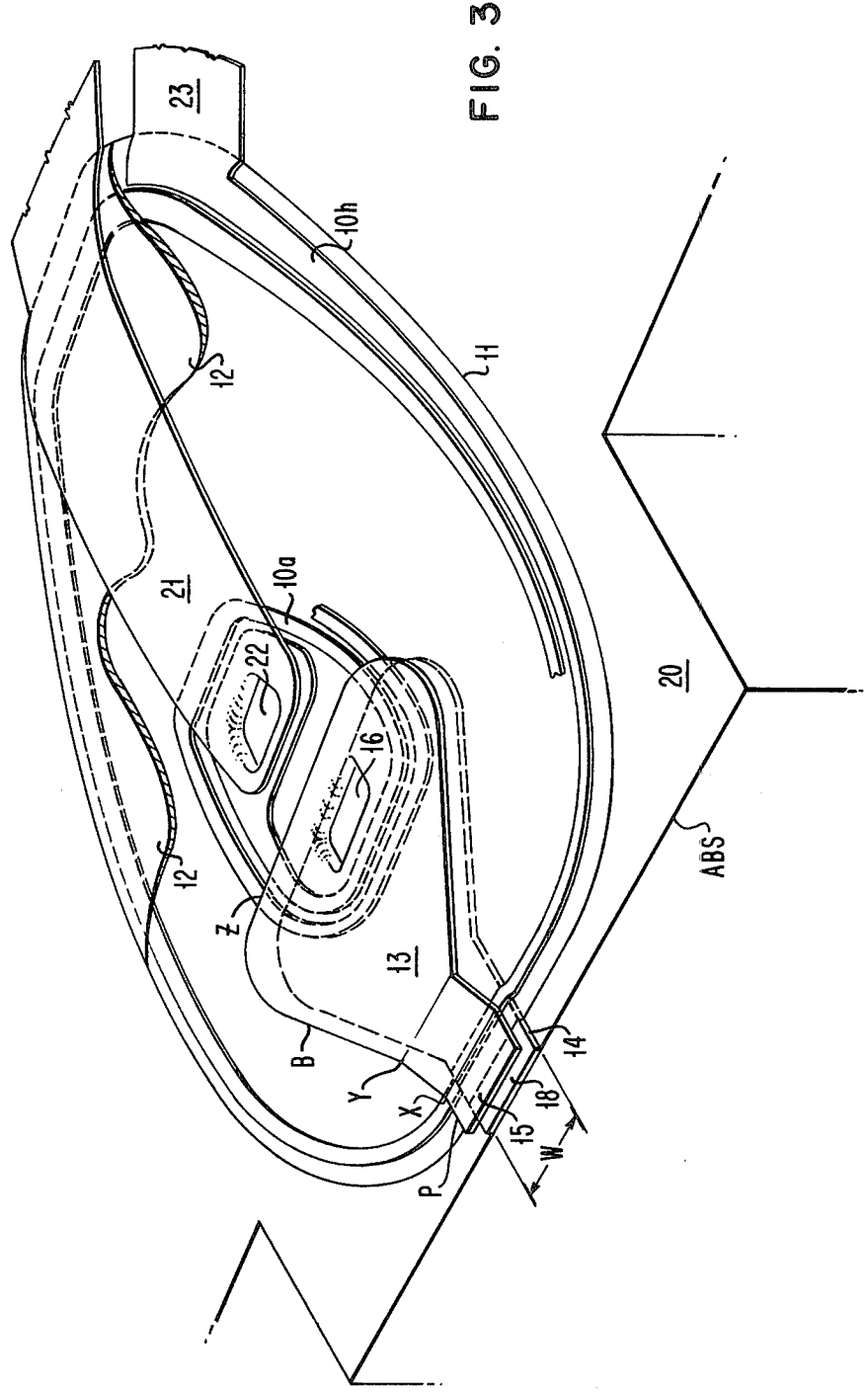

THIN FILM INDUCTIVE TRANSDUCER

DESCRIPTION

TECHNICAL FIELD

This invention relates to thin film inductive transducers for recording and reading magnetic transitions on a moving magnetic recording medium.

One object of this invention is to provide a thin film inductive transducer having a yoke structure configured to maximize resolution of transitions during reading.

Another object is to provide a thin film inductive transducer having a yoke structure configured to oppose saturation of the yoke structure with applied current and enhance the efficiency of the transducer during recording by increasing the cross-sectional area of the yoke structure.

Related Applications Assigned to the Same Assignee

M. A. Church et al, Ser. No. 972,103, filed Dec. 21, 1978 (concurrently with the present application), entitled "Thin Film Magnetic Head Assembly".

BACKGROUND ART

Various configurations have heretofore been proposed to enhance efficiency of transducers of this type during recording and enhance the resolution of transitions during reading. U.S. Pat. Nos. 3,700,827 and 4,016,601 constitute the most pertinent prior art presently known to applicants relating to their transducer configuration.

U.S. Pat. No. 3,700,827 discloses a thin film magnetic head with a yoke structure that narrows from a back region to a pole tip region. A separate magnetic core interconnects the yoke pieces at the back region. A wire coil encircles the magnetic core for activating the pole pieces during recording and transmitting electrical pulses activated in the coil during reading of magnetic transitions from a magnetic recording medium.

U.S. Pat. No. 4,016,601 discloses an integrated magnetic head assembly wherein the pole pieces have a reduced width in the pole tip region and a flat conductor winding coil has a branch inserted between the pole piece layers. The reduction in width in the pole tip region is achieved by etch removal of concave portions of the substrate and pole pieces, such that the distance between the end of the pole tip and the wide portion of the yoke structure is greater than the thickness of one of the magnetic layers plus the magnetic gap.

This prior art does not suggest applicants' improved thin film inductive transducer wherein resolution is maximized during reading by providing a pole tip region of preselected constant relatively narrow width comprising two thin magnetic layers that extend in a direction normal to the magnetic medium. The effects of spurious signals from adjacent tracks on the medium are minimized by having the pole tip region extend a distance at least 5/d, where d is the recording density; however, to maximize transducer efficiency, said distance should not be increased significantly above 5/d. Saturation of the yoke structure with applied current is opposed and efficiency of the transducer is enhanced during recording by increasing the cross-sectional area of the yoke structure in the back region by progressively increasing its width rearward of the pole tip region and concurrently increasing the thickness of said magnetic layers at least about 60%.

BRIEF DESCRIPTION OF DRAWINGS

In the accompanying drawings forming a material part of this disclosure:

FIG. 3 is a perspective view of the transducer embodying the invention.

DISCLOSURE OF INVENTION

Figures 1, 2:
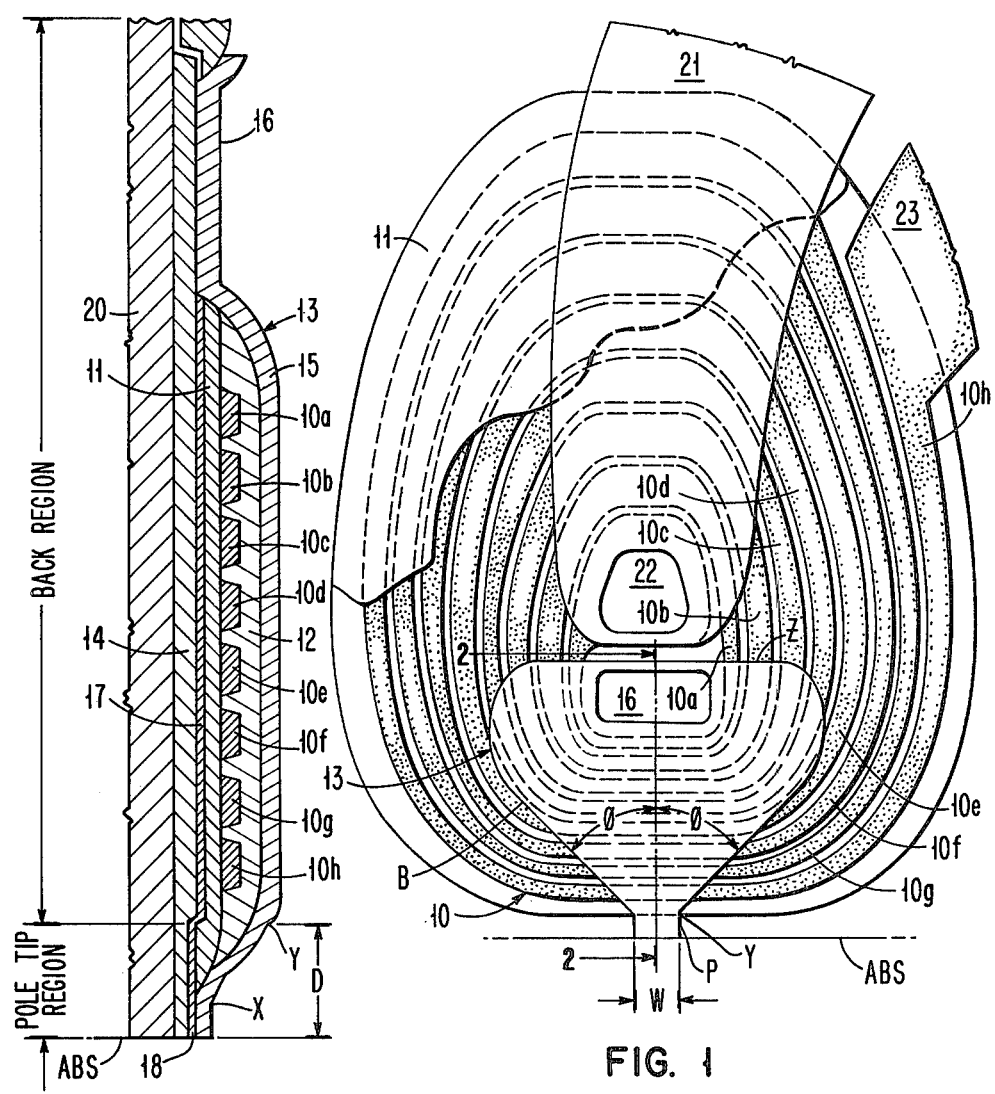
FIG. 1 is a top plan view of a thin film inductive transducer embodying the invention.
FIG. 2 is a sectional view, to enlarged scale, taken along the line 2—2 of FIG. 1.

A more comprehensive understanding of the invention and of the objects and advantages thereof will be apparent from the following description and accompanying drawings and appended claims.

As illustrated in the drawings, the thin film transducer embodying the invention comprises, briefly, a flat conductor coil 10 having a plurality of turns 10a–h plated in an elliptical pattern between two layers 11,12 of insulating material. Adjacent one end of the coil 10 (see FIG. 1), the turns are of narrower width than through the remainder of the coil, for reasons explained in the above-cited related application, and not forming part of the present invention.

A yoke structure 13 consists of a pole tip region P and a back region B, and comprises two layers 14, 15 of a magnetic material, such as Permalloy. These layers 14, 15 are separated by insulating layers 11, 12, respectively, except (a) at a back gap 16 in back region B, where they make physical contact, and (b) at the pole tip region P where they are spaced by a thin layer 17 of non-magnetic material to form a transducing gap at 18. The end of transducing gap 18 coincides with an air bearing surface (ABS) formed on a non-magnetic ceramic slider 20 on which the above-described layers are deposited. Transducer gap 18 interacts in air bearing relation with a magnetic recording medium (not shown), such as a rotatable magnetic disk, when the latter rotates and flies closely adjacent the ABS.

The transducer further comprises a member 21 that makes electrical contact at 22 with the central portion of coil 10; and the outermost turn of coil 10 terminates in an enlarged area to constitute an electrical contact 23. Member 21 is connected to external circuitry (not shown) for processing data signals during recording and reading.

According to a feature of the invention, yoke structure 13 is fabricated in the following manner. Magnetic layer 14 is deposited on slider 20 in two stages, using appropriate masks, to provide a deposit of reduced thickness in pole tip region P. Then the non-magnetic layer 17 is deposited on layer 14 except at back gap 16. Insulating layer 11 is now deposited over the non-magnetic layer 17 except at transducer gap 18. Elliptically spiralling turns 10a–h of continuous flat conductor coil 10 are plated on insulating layer 11. Then insulating layer 12 is deposited over the coil. Magnetic layer 15 is then deposited over the now-insulated coil 10 except, as already noted, at back gap 16, where it makes physical contact with magnetic layer 14. Layer 15 is deposited in two stages, using appropriate masks, so that its thickness in back region B is greater than that in pole tip region P.

According to an important feature of the invention, pole tip region P has a preselected substantially constant width W (FIG. 1) which is equal to or slightly less than the width of a track on the associated rotatable magnetic medium; and the pole tip region extends a relatively short distance D normal to the magnetic medium, to maximize resolution of transitions during reading. Pole tip region P consists of a pole tip that extends from the ABS to a "zero throat point" X (FIG. 2), and a pole tip extension that extends from point X to an "optimum transition point" Y. Between these points X and Y, which is where the magnetic layers 14, 15 contact the coil-insulating layers 11, 12, magnetic layer 15 diverges progressively from the plane of slider 20. Note that the downturned outward edges of insulating layers 11, 12 are caused by some flow of the material during deposition, which results in layer 15 having a somewhat curved cross section; but pole tip region P nevertheless preferably is maintained substantially constant at width W (see FIG. 1) between points X and Y.

According to another important feature of the invention, in back region B that commences beyond point Y, the constant thickness of magnetic layers 14, 15 increases significantly, preferably by about at least 60%, over the preselected smaller thickness of these layers within pole tip region P. This is to oppose saturation of yoke structure 13 when current is applied to coil 10 and to enhance efficiency of the transducer during recording by increasing the cross-sectional area of the yoke structure.

The cross-sectional area of the yoke structure 13 is also increased by having the width of both layers 14, 15 progressively increase, preferably by having the edges of these layers diverge progressively rearward at an angle $\phi$ from point Y (see FIG. 1) terminating in a wide end Z just beyond back gap 16. Yoke structure 13 thus has a configuration, in plan view, similar to that of a truncated triangle (back region B) which joins at its small dimension end a narrow rectangle (pole tip region P), giving an overall appearance similar to that of a ping-pong paddle. The diverging edges, as they approach wide end Z of back region B, may be curved, if desired, as illustrated.

Zero throat point X is that point at which the thickness of pole tip region P would begin to increase if air bearing surface ABS were to proceed further toward point Y. Transition point Y is that point at which the thickness of the magnetic layers 14, 15 increases and at which the magnetic layers begin to diverge at the angle $\phi$ and at which saturation occurs.

It has been found by actual test that the level of pole tip induction at which saturation commences is essentially insensitive to the magnitude of angle $\phi$ provided said angle is maintained between about 30° and 60°. It was also found that the zero throat point X should be as close as possible to the ABS. Difficulties will generally be experienced in fabrication if transition point Y is moved rightward as viewed in FIG. 2 because of the sloping of the outer edges of insulating layers 11, 12. On the other hand, if transition point Y is shifted leftward as viewed in FIG. 2, the transducer efficiency and ability to record will be reduced because the total cross-sectional area of the thick and wide back region B will be correspondingly reduced.

Note that, as preferred and as illustrated in FIG. 2, the thickness of magnetic layers 14, 15 is substantially constant between the ABS and transition point Y. If desired, however, and fabrication techniques permit, the thickness of layers 14, 15 might be increased either gradually or abruptly starting somewhere to the left of point X; or alternatively, the thickness of layer 14 (but not 15) might be increased gradually or abruptly somewhere to the left of point X. In any event, it is imperative that the layers 14, 15 be of the aforementioned preselected substantially constant small thickness at least in that portion of the pole tip region between the ABS and zero throat point X.

Since saturation occurs at optimum transition point Y, it is desirable to keep the pole tip region P at the uniform width W, but keep the distance D as short as possible. This distance D, however, has to be at least equal to 5/d, where d is the recording density on the magnetic medium. This is because with D at least 5/d, the spurious fields from adjacent tracks will be sufficiently weak as not to adversely influence recording or reading of transitions.

Thus, according to one illustrative embodiment, for a recording density of 400 flux changes per millimeter, the distance D should preferably not exceed 18 microns, with the dimension from ABS to point X being not more than 3 microns and the dimension from X to Y being about 12 to 15 microns.

It will thus be seen that, with applicants' improved thin film inductive transducer, yoke structure 13 has a pole tip region P of a predetermined constant width corresponding substantially to the width of a track on the recording medium, with at least the portion between the ABS and point X being of a constant preselected small thickness, and said pole tip region extending a relatively short distance D normal to the magnetic medium, thereby to maximize resolution of transitions during reading from the medium. This distance D must, however, be long enough to keep off-track reading at an acceptably low level. The yoke structure of the improved transducer also comprises a back region B that increases progressively in width from said predetermined constant width and has a back gap 16 substantially centered within the yoke structure adjacent its wider end Z; and the layers 14, 15 of magnetic material in the back region are at least about 60% thicker than their smaller thickness within the pole tip region P, thereby to desirably oppose saturation of the yoke structure with applied current and enhance the efficiency of the transducer during recording by increasing the cross-sectional area of the yoke structure.

While the invention has been particularly shown and described with reference to a preferred embodiment, thereof, it will be understood by those skilled in the art that various changes in form and detail may be made therein without departing from the spirit, scope and teaching of the invention. Accordingly, the transducer herein disclosed is to be considered merely as illustrative and the invention is to be limited only as specified in the claims.

Having thus described our invention, what we claim as new, and desire to secure by Letters Patent is:

1. A thin film inductive transducer for recording and reading magnetic transitions on a selectable one of a plurality of tracks on a magnetic recording medium, said transducer being of the type comprising two layers of a magnetic material forming a yoke structure that is activated by a conductor coil characterized in that:

said yoke structure adjacent its one end comprises a pole tip region in which the layers are of a predetermined substantially constant width and a preselected substantially constant thickness, said predetermined width not exceeding the width of a track on the medium, and said pole tip region extending from said one end a relatively short distance normal to the magnetic medium to an "optimum transition point", thereby to maximize resolution of transitions during recording; and said yoke structure comprises a back region which joins said pole tip region at said "optimum transition point" and in which the layers increase progressively in width from said predetermined width, said back region having a back gap substantially centered adjacent its wider end, the thickness of the layers of magnetic material in said back region being greater than said preselected constant thickness of those layers in said pole tip region, thereby to oppose saturation of the yoke structure with applied current and enhance efficiency of the transducer by increasing the cross-sectional area of the yoke structure.

2. A transducer according to claim 1, further characterized in that the yoke structure as viewed in a direction transverse to the path of the magnetic medium has a configuration substantially similar to that of a ping-pong paddle in plan view.

3. A transducer according to claim 1, further characterized in that said distance is about 5/d, where d is the recording density on the medium.

4. A transducer according to claim 1, further characterized in that each of the layers of magnetic material in said pole tip region have a thickness t and in said back region have a thickness of the order of about at least 160%t.

5. A transducer according to claim 1, further characterized in that the back region increases progressively in width by diverging at a preselected angle of between about 30° and 60° from an axis of symmetry of the yoke structure.

6. A transducer according to claim 1, further characterized in that said relatively short distance is between 12 and 18 microns, when recording density on the medium is of the order of about 400 flux changes per millimeter.

7. A transducer according to claim 1, further characterized in that said pole tip region comprises:
  a pole tip of relatively small total thickness extending a preselected small distance from said one end of the yoke structure to a "zero throat point", and
  a pole tip extension in which the thickness of the layers remain substantially constant, but at least one of the layers diverges from said zero throat point to the "optimum transition point" at which the thickness of each layer increases to a larger dimension and the back region commences.

8. A transducer according to claim 7, wherein said preselected small distance does not exceed about 3 microns and the distance from the zero throat point to the optimum transition point is of the order of about 12 to 15 microns.

9. A thin film inductive transducer for recording and reading magnetic transitions on a magnetic recording medium, said transducer comprising;
  two layers of a magnetic material deposited on a substrate and forming a yoke structure comprising a pole tip region and a back region;
  non-magnetic material deposited between said two layers except at a back gap in the back region, said non-magnetic material forming a transducing gap at the pole tip region;
  a flat conductor coil including a plurality of deposited substantially helical turns, at least respective one portions of which are disposed between the two layers of the yoke structure; and
  insulating material electrically insulating each such portion of the conductor coil from the yoke structure;
  said pole tip region being relatively narrow and disposed at the operational ends of said layers adjacent the magnetic medium and extending to an "optimum transition point" at which said back region joins and becomes progressively substantially wider than said pole tip region and the thickness of each of said layers increases to the order of about 160% of its thickness in said pole tip region; said pole tip region remaining approximately the same width to said "optimum transition point" and for a distance from said operational ends which is about 5/d, where d is the recording density on the magnetic medium.

10. A thin film inductive transducer for recording and reading magnetic transitions on a track of a moving magnetic recording medium, said transducer comprising:
  a first layer of a magnetic material deposited on a substrate in two stages to provide a deposit of reduced thickness in a pole tip region adjacent one end of what will become a yoke structure;
  non-magnetic material deposited on said first layer except at a back gap adjacent the opposite end of what will become a back region of the yoke structure;
  insulating material deposited on said non-magnetic layer except adjacent the pole tip region;
  a conductor coil having generally helical turns, respective portions of which are deposited on said insulating material;
  insulating material deposited on said coil turns; and
  a second layer of magnetic material deposited over the last-mentioned insulating material and cooperating with said first layer to form the yoke structure in which said layers straddle and are insulated from said coil, said first layer being in physical contact with said second layer at the back gap;
  said second layer being of reduced thickness adjacent its one end overlying said one end of said first layer to provide the pole tip region with a narrow width approximating that of the track of the medium, said pole tip region extending from proximity with the medium a distance approximately 5/d, where d is the recording density on the medium, said layers at said pole tip region being separated by said non-magnetic material to form a magnetic gap, and said layers in said back region being of increased thickness and diverging generally uniformly from said narrow width to a preselected greater width, terminating shortly beyond said back gap.

* * * * *